(12) United States Patent
Chen et al.

(10) Patent No.: US 8,185,686 B2
(45) Date of Patent: May 22, 2012

(54) MEMORY SYSTEM AND A CONTROL METHOD THEREOF

(75) Inventors: Ming-Dar Chen, Hsinchu (TW); Hsiang-An Hsieh, Sijhih (TW); Chuan-Sheng Lin, Jhubei (TW)

(73) Assignee: A-Data Technology Co., Ltd., Taipei (TW)

( * ) Notice: Subject to any disclaimer, the term of this patent is extended or adjusted under 35 U.S.C. 154(b) by 455 days.

(21) Appl. No.: 12/385,228

(22) Filed: Apr. 2, 2009

(65) Prior Publication Data

US 2010/0095051 A1 Apr. 15, 2010

(30) Foreign Application Priority Data

Oct. 13, 2008 (TW) ................................ 97139202 A

(51) Int. Cl.
*G06F 13/10* (2006.01)
(52) U.S. Cl. ...................................................... 711/103
(58) Field of Classification Search .................. None
See application file for complete search history.

(56) References Cited

U.S. PATENT DOCUMENTS

| 5,937,425 | A | * | 8/1999 | Ban ................................. 711/103 |
| 2003/0145012 | A1 | * | 7/2003 | Kurth ............................. 707/100 |
| 2005/0036372 | A1 | * | 2/2005 | Sasaki ........................... 365/202 |
| 2006/0106972 | A1 | * | 5/2006 | Gorobets et al. .............. 711/103 |

* cited by examiner

*Primary Examiner* — Duc Doan
(74) *Attorney, Agent, or Firm* — Rosenberg, Klein & Lee

(57) ABSTRACT

A control method for the memory system is suitable for a memory system to process the user data from a host. The control unit divides the address of the storage space of the host into a plurality of logical segments for accessing data. The memory system provides a storage space with a plurality of physical segments to access data. The control method comprises the following steps. Firstly, a master table is provided in the physical memory for recording the mapping relation between the addresses of the logical units and the addresses of the physical units. When the data is written, the mapping relation between the addresses of the logical units and the addresses of the physical units is adjusted according to the wear of the physical units. Finally, the data is written into the physical segment according to the master table.

12 Claims, 9 Drawing Sheets

MEMORY SYSTEM AND A CONTROL METHOD THEREOF

BACKGROUND OF THE INVENTION

1. Field of the Invention

The present invention relates to a control method for a memory system, in particular, the present invention relates to a control method for the wear-leveling of a memory.

2. Description of the Related Art

Non-volatile memory is used for storing data, such as flash memory. The flash memory is usually used as a storage device, such as memory card, USB interface portable disk, and solid state disk, etc.

Reference is made to FIG. 1, which shows a schematic diagram of the system structure of the memory system of the prior art. As shown in FIG. 1, the memory system 13 is coupled with a host 11 so that the data can be accessed between the memory system 13 and the host 11. The host 11 uses the logical address to represent the storage location of the data, and the memory system 11 uses the physical address to represent the storage location of the data. The memory system 13 includes a storage module 131 and a control module 133. The storage module 131 is used for storing data. When the host 11 wants to access data in the storage module 131, the control module 133 converts the logical address from the host 11 into the physical address for the storage module 131 to access data.

Because the ranges of the logical address and the physical address are very large, it is time-consuming to convert the logical address into the corresponding physical address. Therefore, the storage module 131 is divided into a plurality of physical blocks, and the storage space of the host 11 is also divided into a plurality of logical blocks. Each block includes a plurality of addresses. The block is used as a unit to convert the logical address into the physical address to improve the memory management. However, it is still time-consuming to convert the logical address into the corresponding physical address within a large memory space so that segment is developed to overcome the above problem.

In the memory system 13 used the segment as a unit, the storage module 131 is divided into a plurality of physical segments, and the storage space in the host 11 also is divided into a plurality of logical segments. Each of the logical segments respectively corresponds to one physical segment, and each segment includes a plurality of blocks. Reference is made to FIG. 2, which is a schematic diagram of the segment logical to physical address conversion. As shown in FIG. 2, after the logical addresses of the storage space in the host 11 is calculated, the addresses is divided into 8000 logical block addresses (LBA). 250 logical block addresses is used as a unit and is defined as a logical segment. Therefore, 32 logical segments $LS_0$, $LS_1$, ..., $LS_{31}$ are obtained. The storage module 131 in the memory system 13 also is divided into 32 physical segments $PS_0$, $PS_1$, ..., $PS_{31}$ by the same concept. Each physical segment has 256 continuous physical block addresses (PBA). Wherein, 250 physical blocks correspond to the logical blocks, and 6 physical blocks are used as free blocks for recording control data or replacing the damaged physical blocks.

In the memory system 13, the free block stores the L2P mapping table that records the mapping relation between the physical blocks in each physical segment and the logical blocks. The logical segment $LS_0$ records the logical addresses 0~63999 that are divided into 250 logical block (LBA 0~249). The L2P mapping table records the mapping relation between the 250 logical blocks and the 256 physical blocks (PBA=0~255). By referring to the L2P mapping table, the logical address can be rapidly and exactly mapped to the physical address.

By using the segment concept, the quantity of the memory conversion units is reduced and it does not need to provide a lot of storage space to store the L2P mapping table. However, the erase cycles of the flash memory is limited. The method for using the storage space and the different updating frequency for recording data in the host 11 both will affect the storage space location in the storage module 131 so that the erase cycles for each physical block are different. Moreover, each physical segment includes a fixed range physical blocks and a fixed mapping way. For example, logical blocks LBA=0~249 in logical segment $LS_0$ is mapped to the physical blocks PBA=0~255 in the physical segments $PS_0$. Thereby, even through the erase cycles of the physical blocks in a single physical segment can be uniform, a specific physical segment still will be erased too much times and worn due to the fixed range physical segment structure. The usage life of the memory system 13 is shortened.

SUMMARY OF THE INVENTION

One particular aspect of the present invention is to provide a control method for memory system that changes the mapping relation between the logical segments and the physical segments according to the wear and loading of the physical segments. Thereby, the problem of the erase cycles of the physical segments being different due to the updating frequency is different is improved.

Another particular aspect of the present invention is to provide a memory system and a control method thereof. When data is allocated to the memory, the wear-leveling is achieved to increase the usage life of the memory system.

The memory system is suitable for a host to access user data. The host has a storage space with a plurality of logical units to store the user data. The memory system includes a storage module and a control module. The storage module includes a storage space with a plurality of physical units, and each physical unit includes a plurality of physical blocks. The storage module reserves at least one physical block to store a master table to record the mapping relation between the addresses of the logical units and the addresses of the physical units. The control unit which is coupled between the host and the storage module adjusts the mapping relation between the addresses of the logical units and the addresses of the physical units according to the erase cycles of the physical units. Thereby, the control module determines the corresponding physical unit of the user data according to the master table when the user accesses the user data.

In one embodiment, the logical unit is a logical segment, and the physical unit is a physical segment. Each physical unit has a segment table to indicate the allocation information of the physical blocks in the physical unit.

The master table records the starting address, the length and the address of the segment table for each physical unit.

The present invention also provides a control method for the memory system that is suitable for a memory system to process the user data transmitted form a host. The control module divides the storage space of the host for accessing the user data into a plurality of logical units. The memory system provides a storage space with a plurality of physical units to store the user data. Each physical unit includes a plurality of physical blocks, and each physical block is composed of a plurality of physical pages. The control method includes the following steps. First, a master table is provided in the physical block for recording the mapping relation between the addresses of the logical units and the addresses of the physical units. When the user data is accessed, the mapping relation between the addresses of the logical units and the addresses of the physical units is adjusted according to the wear of the physical units. Next, the adjusted mapping relation between the addresses of the logical units and the addresses of the physical units is updated in the master table. Finally, according to the master table, the user data is written to the corresponding physical unit.

The present invention can adjust the mapping relation between the logical storage space and the physical storage space to use the physical storage space in cycle and achieve the wear-leveling effect.

For further understanding of the present invention, reference is made to the following detailed description illustrating the embodiments and examples of the present invention. The description is for illustrative purpose only and is not intended to limit the scope of the claim.

BRIEF DESCRIPTION OF THE DRAWINGS

The drawings included herein provide a further understanding of the present invention. A brief introduction of the drawings is as follows:

FIGS. 8-1~8-3 are flow charts of the control method for the memory system of the present invention.

DETAILED DESCRIPTION OF THE PREFERRED EMBODIMENTS

The memory system and the control method thereof of the present invention can adjust the mapping relation between the logical segment and the physical segment. The length and the range of the physical segment can be changed. By writing data orderly and using the physical storage space cyclically, the wear-leveling of the memory is achieved, and the usage life of the memory device is increased.

The present invention provides a control method for the wear-leveling of the memory system and a memory system using the control method. The following merely discloses the main system structure and the operation flow chart. However, in addition to the disclosed elements, the person who skills in the field know the memory system still includes other elements. Therefore, the concept is not limited to the disclosed elements.

Figure 3:
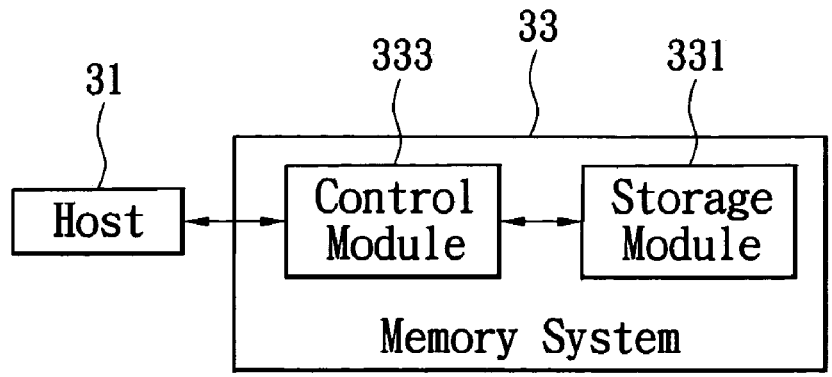
FIG. 3 is a schematic diagram of the system structure of the memory system of the present invention.

Reference is made to FIG. 3, which shows a schematic diagram of the system structure of the memory system of the present invention. As shown in FIG. 3, the memory system 33 is coupled with the host 31, and accepts the instruction from the host 31 to read or write the corresponding user data.

The memory system 33 includes a storage module 331 and a control module 333. The storage module 331 is composed of flash memory for storing the user data. The control module 333 is coupled between the host 31 and the storage module 333 for receiving an instruction from the host 31. The instruction is a writing instruction or a reading instruction. The writing instruction is to write user data corresponded to a logical address into the storage module 331. The reading instruction is to read user data corresponded to a logical address from the storage module 331.

In one embodiment, the storage module 331 further includes one of non-volatile memories, including ReRAM, MRAM, PRAM.

Figure 4:
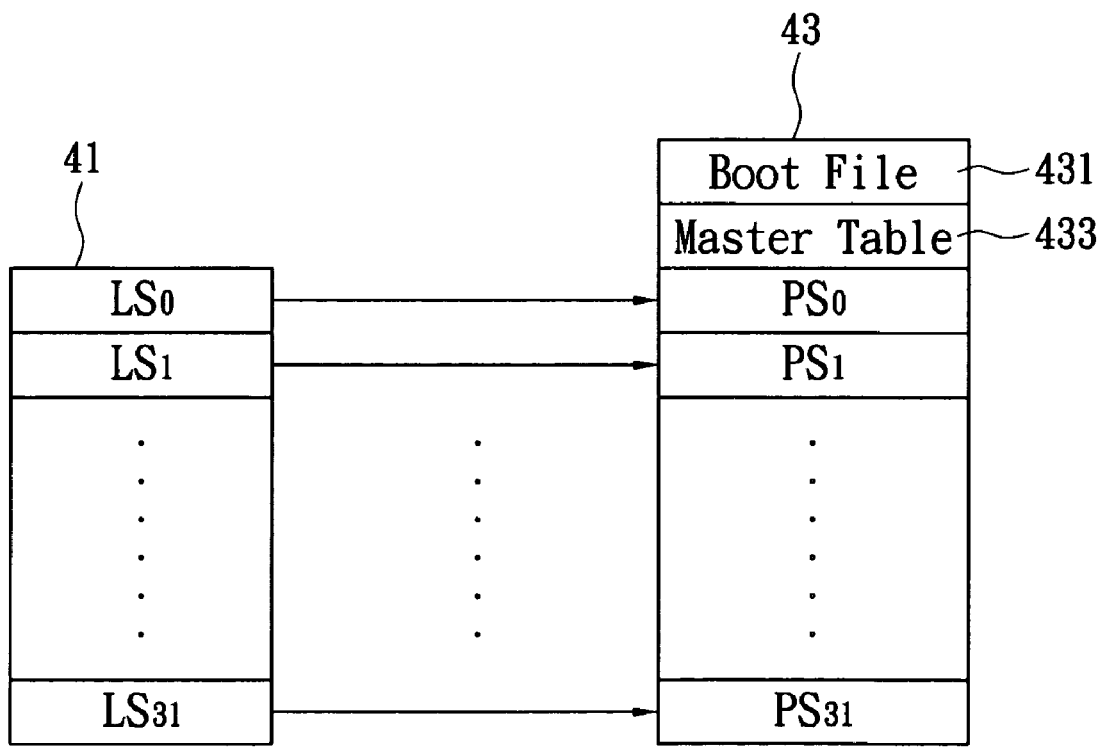
FIG. 4 is a schematic diagram of the storage structure of the logical/physical segments mapping relation of the present invention.

In order to understand the logical/physical address mapping relation, reference is made to FIG. 4 that is schematic diagram of the storage structure of the logical/physical segments mapping relation of the present invention. As shown in FIG. 4, the host 31 and the storage module 331 respectively provides a logical storage space 41 and a physical storage space 43 for the user data. The logical storage space 41 is divided into 32 logical segments $LS_0$~$LS_{31}$. The physical storage space 43 also is divided into 32 physical segments $PS_0$~$PS_{31}$ to correspond to the logical segments $LS_0$~$LS_{31}$. In one embodiment, each logical segment $LS_i$ is composed of 250 logical blocks, and each physical segment $PS_i$ is composed of 256 physical blocks. Wherein, 250 physical blocks are used for corresponding to the logical blocks, and 6 physical blocks are free blocks.

Figure 5:
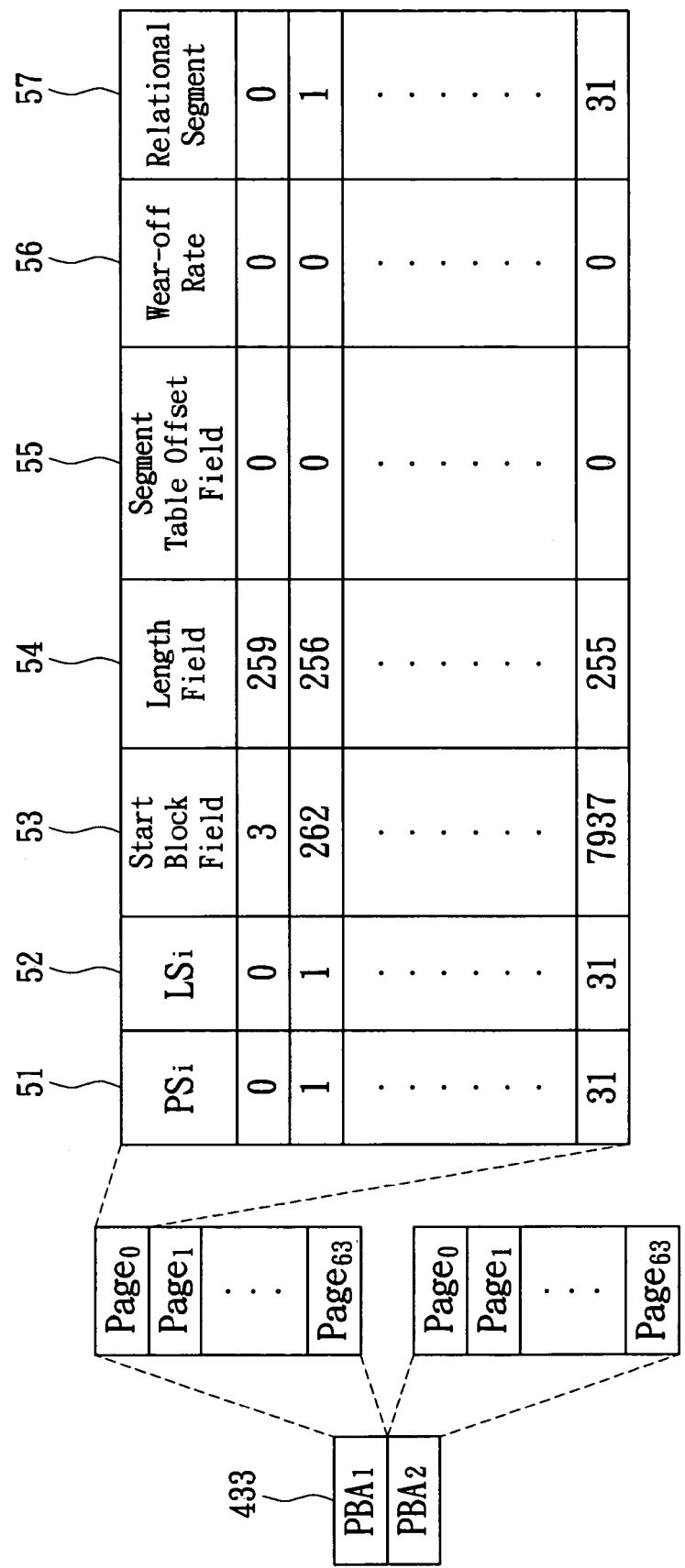
FIG. 5 is a schematic diagram of the master table of the present invention.

The storage module 331 reserves at least two physical blocks to store a boot file 431 and a master table 433. The boot file 431 records the required information to boot up the memory system 33, such as firmware image, vendor information, etc. The master table 433 records the mapping relation between logical segment $LS_i$ and the physical segment $PS_i$. Reference is also made to FIG. 5, which is a schematic diagram of the master table of the present invention.

As shown in FIG. 5, the storage module 331 reserves two physical blocks $PBA_1$, $PBA_2$ to store the master table 433. The master table 433 includes a physical segment field 51, a logical segment field 52, a start block field 53, a length field 54, a segment table offset field 55, and information, including wear rate 56 and relative segment 57. The physical segment field 51 and logical segment field 52 indicate the mapping relationship for each segment. In one embodiment, the physical segment $PS_i$ is mapped to the logical segment $LS_j$, and i=j.

The start block field 53 and the length field 54 respectively indicate the start block address and the segment length for each physical segment $PS_i$. The start block address and the segment length can be changed according to the data process situation of the physical storage space 43 so that each physical segment $PS_i$ has adequate free blocks. For example, physical storage space 43 has 8192 physical blocks $PBA_i$. Three physical blocks $PBA_0$, $PBA_1$, $PBA_2$ are used for storing the boot file 431 and the master table 433, and the physical segment $PS_0$ has three bad physical blocks. Therefore, after the other physical blocks $PBA_i$ are averagely divided into 32 physical segments, each physical segment $PS_i$ has 255 or 256 physical blocks $PBA_i$. Because the physical blocks $PBA_0$, $PBA_1$, $PBA_2$ are reserved, the start block of the physical segment $PS_0$ is $PBA_3$. In order to reserve 6 free blocks, three physical blocks $PBA_i$ are added to the physical segment $PS_0$. Therefore, the range of the physical segment $PS_0$ is from $PBA_3$ to $PBA_{261}$. By using the same way, the physical blocks for $PS_i$ are determined.

The physical segment $PS_0$ still has 256 physical blocks $PBA_i$ to be mapped with the 250 logical blocks in logical segment $LS_0$, and has 6 free blocks.

Each physical segment $PS_i$ has a segment table for indicating the physical blocks $PBA_i$ included in the physical segment $PS_i$, and the mapping relation with the logical blocks and the allocation information. The content in the segment table offset field 55 is used for indicating the physical block address for each segment table.

The wear rate field 56 is used for recording the wear of the physical segment $PS_i$. The control module 333 adjusts the mapping relation between the physical segment $PS_i$ and the logical segment $LS_i$ according to wear of the physical segment $PS_i$, and records the adjusted information in the relative segment field 57.

In one embodiment, the storage module 331 reserves two physical blocks $PBA_1$, $PBA_2$ to store the master table 433, and physical block is divided into 64 physical pages $Page_0 \sim Page_{63}$. Initially, the master table 433 is stored in the physical page $Page_0$ of the physical block $PBA_1$, and uses the physical page $Page_i$ as a unit. When the content of the master table 433 is updated, the updated master table 433 is orderly stored in the physical page $Page_1$ until physical page $Page_{63}$. Next, the updated master table 433 is stored in physical page $Page_0$ of the physical block $PBA_2$, and erases the physical block $PBA_1$. When the updated master table 433 is stored in physical page $Page_{63}$ of the physical block $PBA_2$, the next updated master table 433 is stored in physical block $PBA_1$. By repeating the above steps, the content of the master table 433 is maintained by using the cycle storage algorithm.

Figure 6:
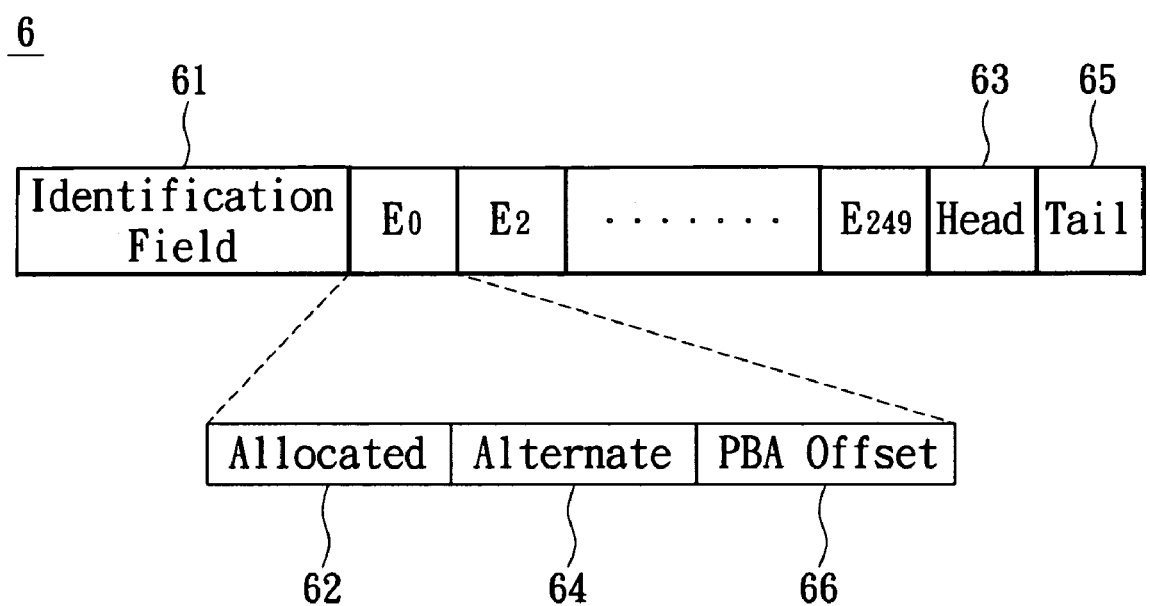
FIG. 6 is a schematic diagram of the segment table of the present invention.

Reference is made to FIG. 6, which is a schematic diagram of the segment table of the present invention. The system structure is referred to FIGS. 3~5. As shown in FIG. 6, the segment table 6 includes an identification field 61, a plurality of allocation information fields $E_0 \sim E_{249}$, a head pointer register 63, and a tail pointer register 65. The identification field 61 is used for checking whether the data structure is the content of the segment table 6. The allocation information fields $E_i$ is the mapping information between the logical blocks and the physical blocks, and includes an allocated flag field 62, an alternate segment flag field 64, and a PBA offset field 66.

The allocated flag field 62 is used for indicating whether the physical block is allocated to access the user data or not. When the content of the allocated flag field 62 is set to 1, it means that the physical block is allocated. The alternate segment flag field 64 is used for indicating whether the mapping relation between the logical block and the physical block is adjusted or not. When the content of the alternate segment flag field 64 is set to 1, it means that the physical block is switched with another physical block. When the content of the alternate segment flag field 64 is set to 0, it means that the physical block is not switched with another physical block. The PBA offset field 66 is used for indicating the physical block address, and is the offset address from the start physical block of the physical segment For example, when the user data on the logical block of the logical segment $LS_0$ will be written to the physical block of the physical segment $PS_0$, the information on the allocation information field $E_0$ is checked. When the allocated flag field 62 is 1, the alternate segment flag field 64 is 0 and the PBA offset field 66 is 1, the user data will be written to the physical block with offset 1 from the start block of the physical segment $PS_0$, $PBA_3+1=PBA_4$. When the allocated flag field 62 is 1, the alternate segment flag field 64 is 1 and the PBA offset field 66 is 1, the relative segment field of the master table 433 is checked. If the relative segment of the physical segment $PS_0$ is physical segment $PS_{31}$ and the start physical block of the physical segment $PS_{31}$ is physical block $PBA_{7937}$, the user data will be written to the physical block with offset 1 from the start block of the physical segment $PS_{31}$, $PBA_{7937}+1=PBA_{7938}$.

The head pointer register 63 and the tail pointer register 65 are used for bounding a range of the valid physical blocks in the physical segment for accessing the user data in the physical blocks.

Figure 7A:
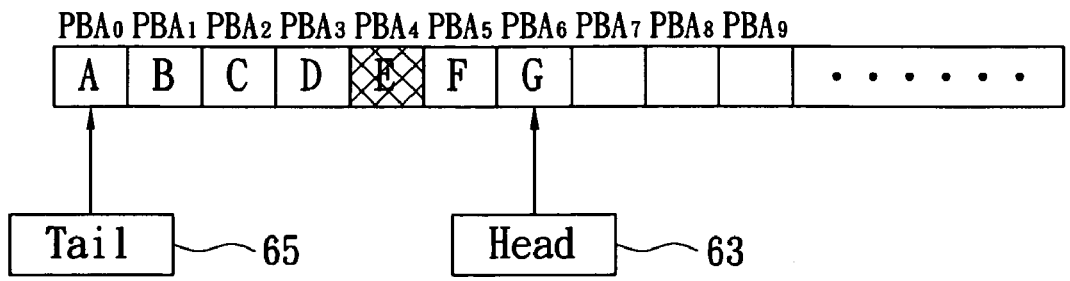
FIGS. 7A~7C are schematic diagrams of the data process procedure of the present invention.
Figure 7B:
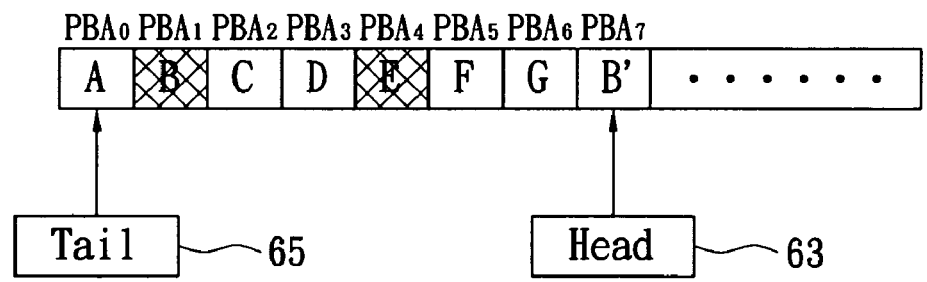
Figure 7C:
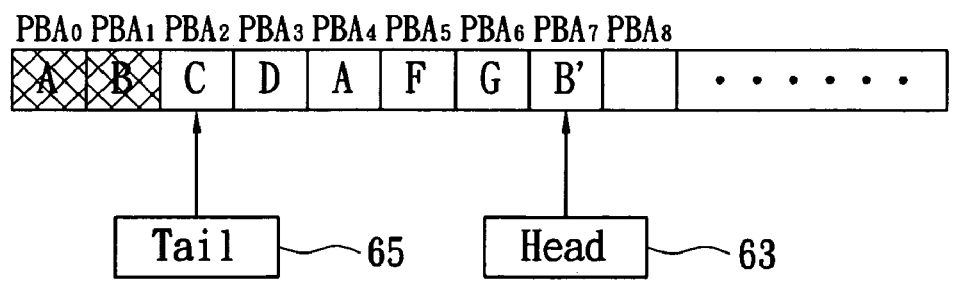

In order to illustrate the process of the access of the user data for the storage module 331, reference is made to FIGS. 7A~7C, which are the schematic diagrams of the data process procedure of the present invention. In the physical blocks provided by the storage module 331, the address stored in the head pointer register 63 is pointed to the valid physical block for the user data, and the address on the tail pointer register 65 is the last physical block that has been stored with the user data. The range between the head pointer register 63 and the tail pointer register 65 is the physical blocks that are allocated and have the valid user data in the segment. The storage module 331 can be treated as a cycle storage space. The new user data is written to the physical block indicated by the head pointer register 63, and the physical block indicated by the tail pointer register 65 is adjusted according to the situation. When the user data is written to one end of the physical segment, the content of the register is set to indicate to another end of the physical block. Thereby, the physical blocks can be cyclically and orderly allocated to achieve the wear-leveling effect.

As shown in FIG. 7A, the storage module 331 includes a plurality of physical blocks $PBA_i$, and defines a threshold value to limit the quantity of the allocation physical blocks. For example, maximum 7 physical blocks can be used for storing the user data. The user data A~G is written into the physical blocks $PBA_0 \sim PBA_6$. Wherein, the physical block $PBA_4$ stored the data E was erased previously. The data A in the physical block $PBA_0$ is the oldest data, and the data G in the physical block $PBA_6$ is the newest data. At this time, the tail pointer register 65 indicates to the physical block $PBA_0$, and the head pointer register 63 indicates to the physical block $PBA_6$ to represent that the physical blocks $PBA_0 \sim PBA_6$ are the range of the allocation physical blocks.

As shown in FIG. 7B, when a user data B' is written, the head pointer register 63 is pointed to the physical block $PBA_7$ to allocate the user data B', and erases the physical block $PBA_1$. However, the range of the allocation physical block is $PBA_0 \sim PBA_7$, and the blocks will surpass the threshold value. In order to control the quantity of the free blocks, the block-recycling procedure is performed.

As shown in FIG. 7C, the block-recycling procedure determines whether the data A stored in the physical block $PBA_0$ indicated by the tail pointer register 65 is erased or not. Because the data A is not erased and valid, the data A will be stored in the available physical block that is nearest the physical block indicated by the head pointer register 63. Wherein the nearest physical block is between the physical block indicated by the head pointer register 63 and the physical block indicated by the tail pointer register 65. That means that the data A is allocated to the $PBA_4$. Next, the data A in the physical block $PBA_0$ indicated by the tail pointer register 65 is erased, and the tail pointer register 65 is indicated to the physical block $PBA_1$. On the other side, when the data stored in the physical block indicated by the tail pointer register 65 is erased, the tail pointer register 65 is indicated to the next available physical block. That means that the physical block $PBA_1$ indicated by the tail pointer register 65 is erased, and the tail pointer register 65 is indicated to the physical block $PBA_2$. By using the same procedures, the data is cyclically allocated.

The threshold value is a user setting value, or is determined by the quantity of the free physical blocks reserved by the memory system 33. For example, when 6 physical blocks of 256 physical blocks are reserved as the free physical block, the threshold value is set to 250. When the range of the valid physical blocks surpasses 250 physical blocks, the block-recycling procedure is performed.

In one embodiment, the segment table 6 is stored in one physical block for each physical segment. Similar to the updating procedure of the master table 433, the segment table 6 uses the physical page as a unit to be written in the physical block. When the physical block is full, one available physical block of the physical segment is found to write the segment table 6, and the original physical block is erased. In other words, the content of the segment table 6 can be treated as user data, and is cyclically allocated in the physical storage space 43 with the other user data.

Figure 1:
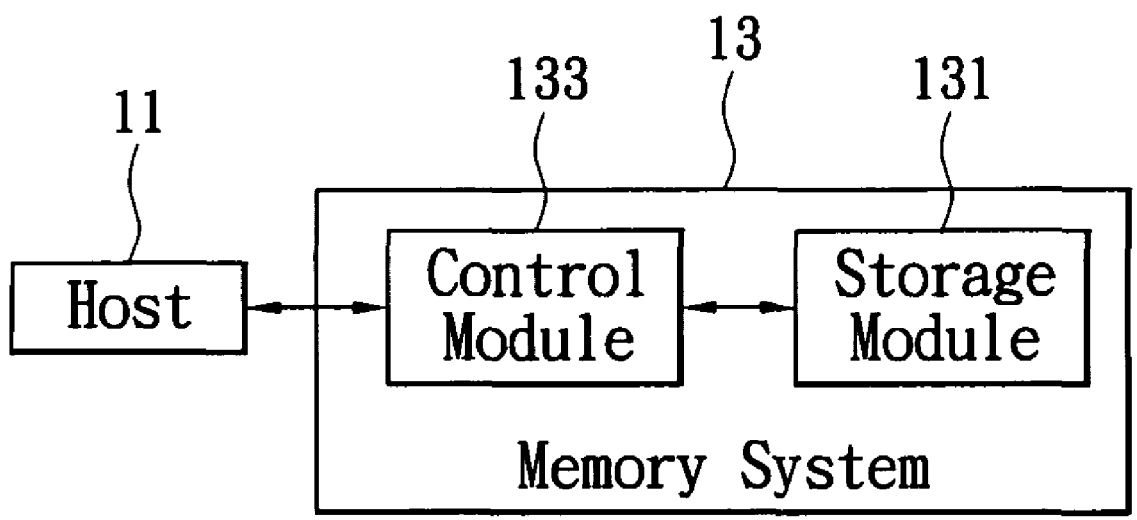
FIG. 1 is a schematic diagram of the system structure of the memory system of the prior art.
Figure 2:
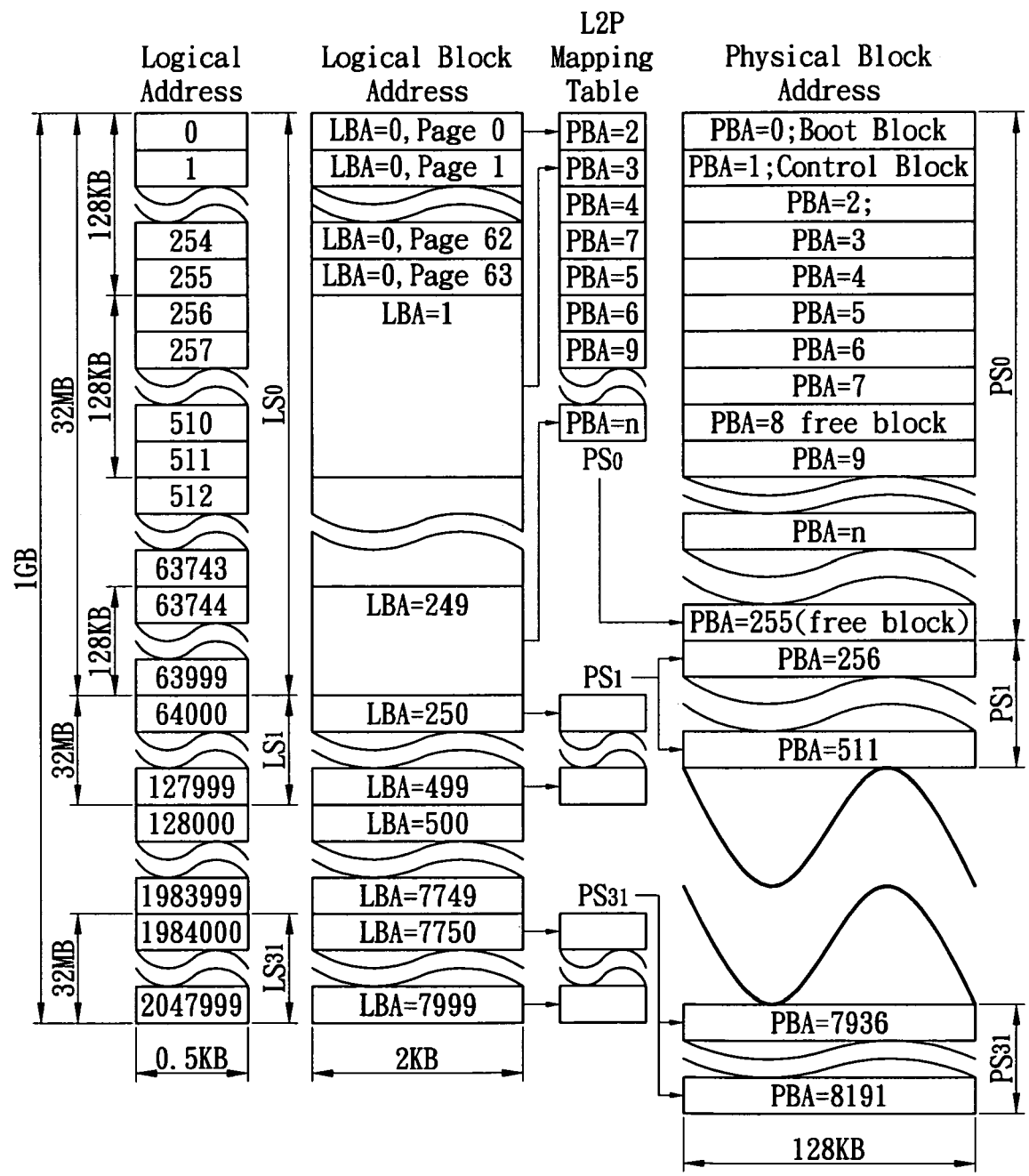
FIG. 2 is a schematic diagram of the segment logical to physical address conversion of the prior art.
Figures 1, 8:
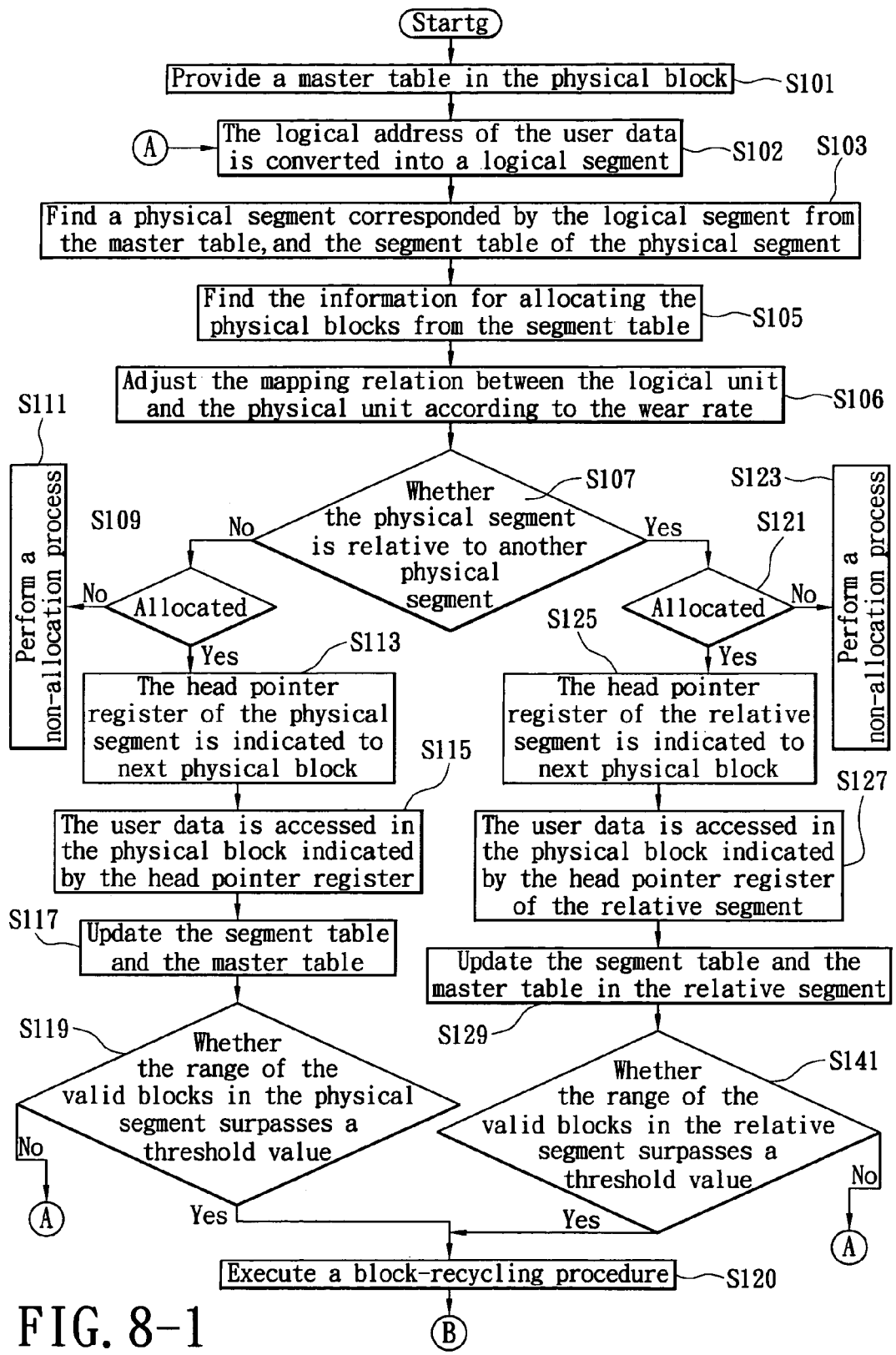
Figures 2, 8:
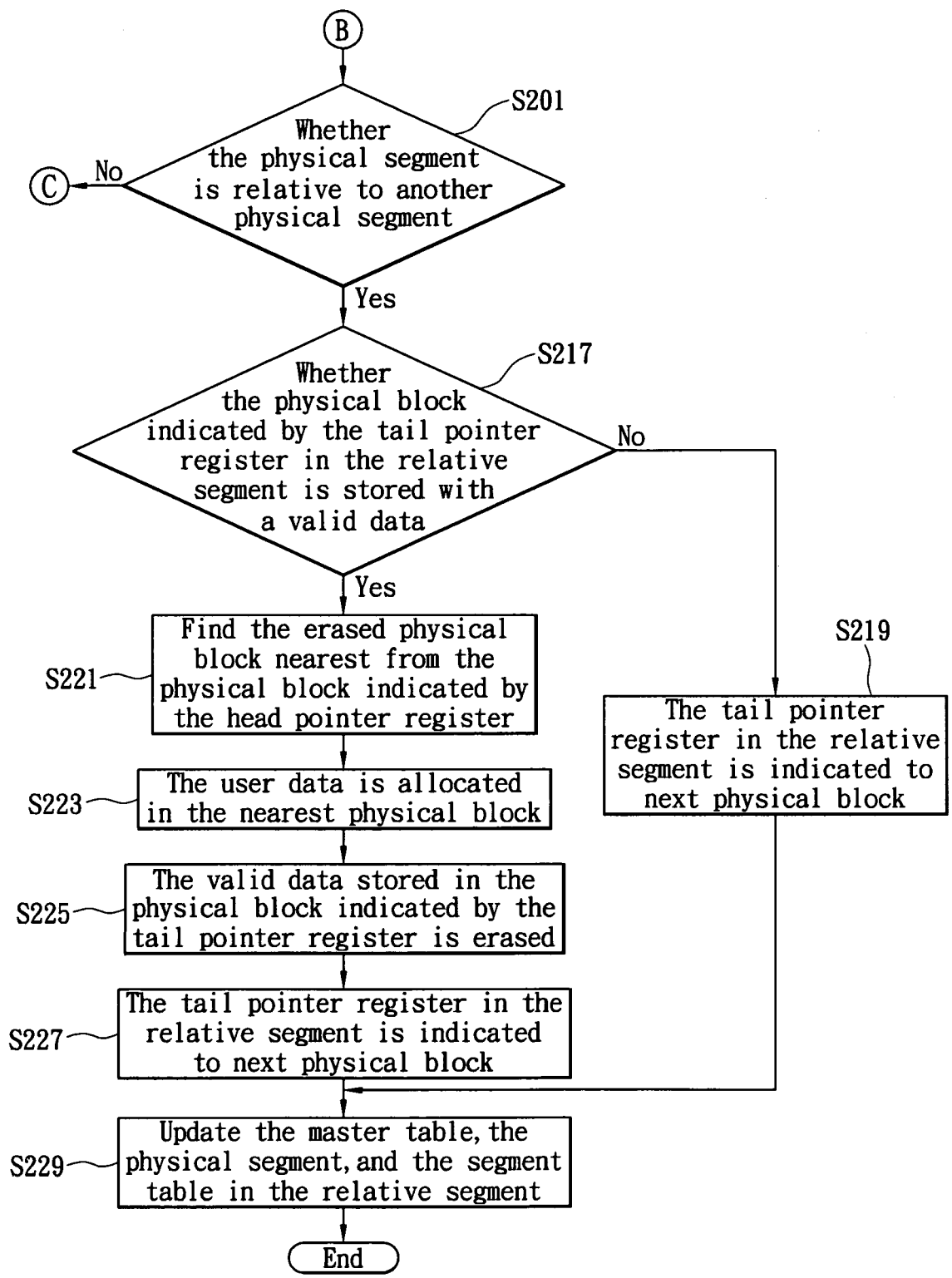
Figures 3, 8:
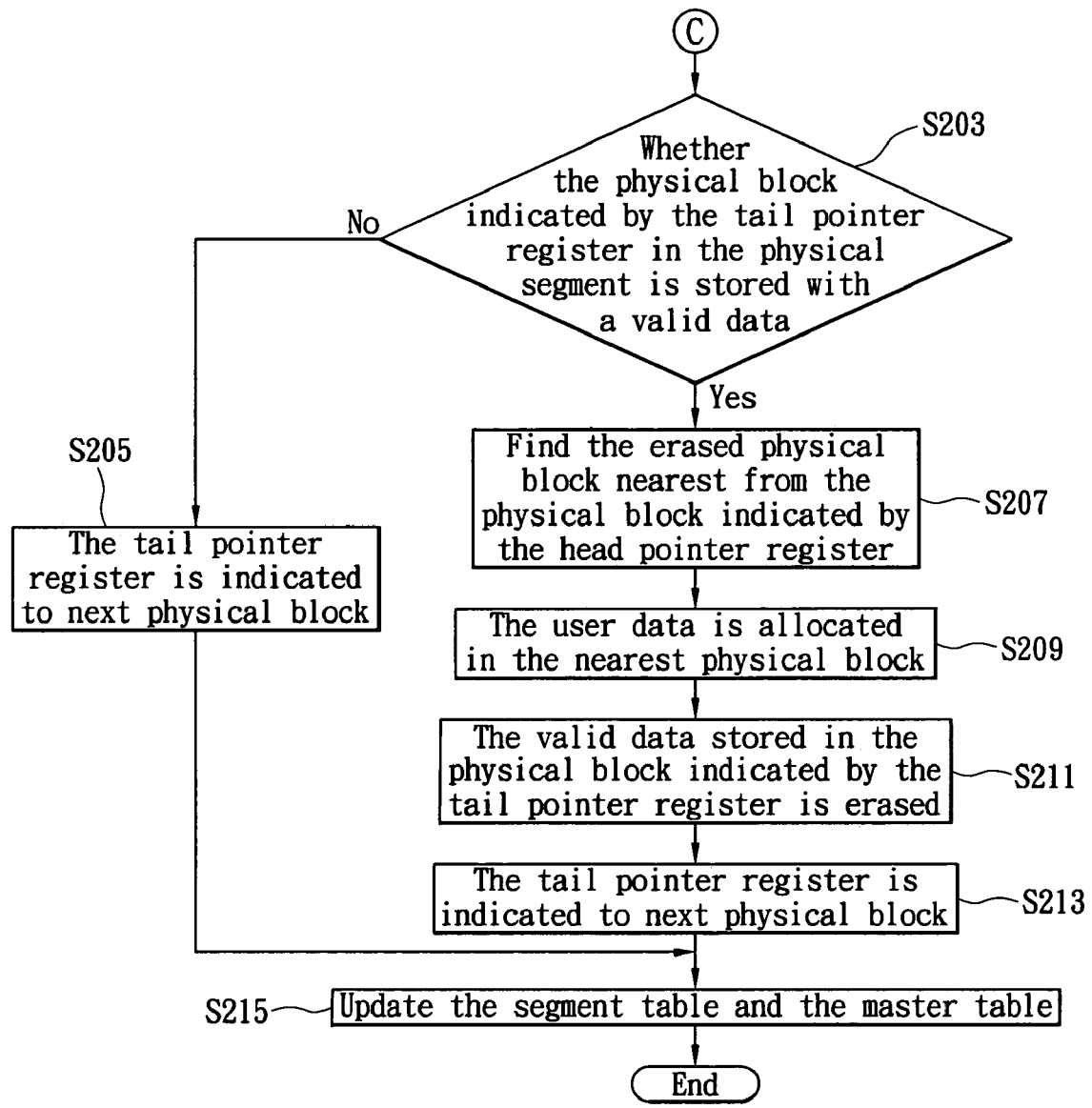

Finally, reference is made to FIGS. 8-1~8-3, which are the flow chart of the control method of the memory system. The system structure and the table are also referred to FIGS. 3~7. As shown in FIG. 8-1~8-3, the control method includes the following steps.

Firstly, the master table 433 is provided into the physical block (step S101). A logical address of storing user data is transferred into a logical segment (represented by $LS_i$, step S102). Next, the control module 333 finds a physical segment (represented by $PS_i$) corresponded by the logical segment $LS_i$ from the master table, and finds the physical block address stored by the segment table 6 of the physical segment $PS_i$ from the segment table offset field 55 (S103). The information for allocating the physical block is found from the segment table 6 (S105). During accessing the user data, the mapping relation between the logical segment $LS_i$ and the physical block is adjusted according to the wear rate of the physical segment $PS_i$ (step S106).

The value of the relative segment field 57 is checked to determine whether the physical segment $PS_i$ is relative to other physical block or not (step S107). If no, the allocated flag field 62 is checked to determine whether the physical segment $PS_i$ is allocated with physical blocks to access the user data (step S109). If no physical blocks are allocated, a non-allocation process procedure is performed (step S111). In one embodiment, the non-allocation process procedure is implemented by the control module 333 to response a default value (such as 0xFF) to represent no storage space being allocated.

If the result of step S109 is yes, a data process procedure is perform that make the head pointer register 63 of the physical segment $PS_i$ indicate to next physical block (step S113). The user data is stored into the physical block indicated by the head pointer register 63 (step S115). Next, the changed parameter from the above procedure (such as the value of the head pointer register 63) is used for updating the content of the segment table 6 and the master table 433 (step S117). Finally, whether the range of the allocation physical blocks in the physical segment $PS_i$ surpasses a threshold value is determined (step S119). If no, the step S102 is executed to access the next user data. If the result of step S119 is yes, a block-recycling procedure is executed (step S120).

After the value of the relative segment field 57 is checked in step S107 and the physical segment $PS_i$ is relative to another physical block (represented by $PS_j$, i≠j), the allocated flag field 62 of the segment table of the physical segment $PS_j$ is checked to determine whether the physical segment $PS_j$ is allocated with physical blocks to access the user data (step S121). If no physical blocks are allocated, a non-allocation process procedure is performed (step S123). In one embodiment, the non-allocation process procedure is implemented by the control module 333 to response a default value to represent no storage space being allocated.

If the result of step S121 is yes, a data process procedure is perform that make the head pointer register 63 of the physical segment $PS_j$ indicate to next physical block (step S125). The user data is stored into the physical block indicated by the head pointer register 63 (step S127). Next, the changed parameter from the above procedure (such as the value of the head pointer register 63) is used for updating the content of the segment table 6 and the master table 433 (step S129). Finally, whether the range of the allocation physical blocks in the physical segment $PS_j$ surpasses a threshold value is determined (step S141). If no, the step S102 is executed to access the next user data. If the result of step S141 is yes, a block-recycling procedure is executed (step S120).

The block-recycling procedures for the physical segment is relative or is not relative to another physical segment are different. After the block-recycling procedure is executed (step S120), whether the processed physical segment $PS_i$ is relative to another physical segment is firstly determined (step S201). Because the step S107 has the same procedure, the step S201 can be omitted. If the physical segment $PS_i$ is not relative to another physical segment, whether the tail pointer register 65 of the physical segment $PS_i$ is stored with valid data or not is determined (step S203). If no, it means that the physical block is erased. The tail pointer register 65 is indicated to next physical block (step S205), and the changed parameter from the above procedures (such as the value of the tail pointer register 65) is used for updating the content of the segment table 6 and the master table 433 (step S215).

If the result of the step S203 is yes, find the erased physical block which is the nearest physical block from the physical block indicated by the head pointer register 63, wherein the nearest physical block is between the physical block indicated by the head pointer register 63 and the physical block indicated by the tail pointer register 65(step S207), and the valid data stored in the physical block indicated by the tail pointer register 65 is written (step S209). Then, the physical block indicated by the tail pointer register 65 is erased (step S211), and the tail pointer register 65 is indicated to next physical block (step S213). Finally, the changed parameter from the above procedures is used for updating the content of the segment table 6 and the master table 433 (step S215).

However, when the physical segment $PS_i$ is relative to physical segment $PS_j$ (the result of the step S201 is yes), whether the physical block indicated by the tail pointer register 65 of the physical segment $PS_j$ is stored with valid data or not is determined (S217). If no, it means that the physical block has been erased. The tail pointer register 65 is indicated to next physical block (step S219), and the changed parameter from the above procedures is used for updating the master table 433, the segment table 6 of physical segment $PS_i$ and the segment table 6 of the physical segment $PS_j$ (step S215).

If the result of the step S217 is yes, find the erased physical block which is the nearest physical block from the physical block indicated by the head pointer register 63, wherein the nearest physical block is between the physical block indicated by the head pointer register 63 and the physical block indicated by the tail pointer register 65 (step S221), and the valid data stored in the physical block indicated by the tail pointer register 65 is written (step S223). Then, the physical block indicated by the tail pointer register 65 is erased (step S225), and the tail pointer register 65 is indicated to next physical block (step S227). Finally, the changed parameter from the above procedures is used for updating the content of the segment table 6 and the master table 433 (step S229).

Thereby, part of the user data in the logical segment $LS_i$ can be accessed in the physical segment $PS_i$ and part of the user data in the logical segment $LS_i$ can be accessed in the physical segment PS$_j$, and the master table 433 and the segment table 6 are used for recording the exact location for the user data. Therefore, the logical segment LS$_i$ that originally is mapped to the physical segment PS$_i$ can be adjusted to the physical segment PS$_j$ that its access frequency is less to achieve the wear-leveling effect.

The memory system and the control method thereof of the present invention utilizes the master table to record the mapping relation between the logical segment and the physical segment, and provides the data process method to control the user data to be accessed in different physical blocks. The present invention has the following characteristics.

1. The range and the length of the physical segment can be changed according the usage status of the physical storage space, and the mapping relation between the physical segment and the logical segment can be adjusted according to the wear rate of the physical segment to average the usage of physical segment.

2. The segment table is used for recording the allocation for each physical segment, and the head pointer register and the tail pointer register are utilized so that the user data can be orderly and cyclically accessed in any physical segment and the wear rate for each physical block in the physical segment is the same.

3. The static old data can be moved to another physical block by the block-recycling procedure so that the physical block stored with the static old data can be released to access the other user data.

4. By utilizing the data structure of the segment table, the head pointer register always is indicated to the last user data, and the tail pointer register always is indicated to the oldest user data. Even though the least recently used (LRU) or the least frequently used (LFU) algorithm is not adapted, the data can be effectively processed.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A memory system, comprising:
   a host having a storage space composed of a plurality of logical units for a user data to be accessed;
   a storage module including a storage space with a plurality of physical units, wherein each physical unit includes a plurality of physical blocks, the storage module reserves at least two physical blocks to respectively store a master table in which one of a start block address, a length, a cycle time, a logical to physical (L2P) table offset, and an associated segment or a combination thereof for each of the physical units is stored and a mapping relation between a logical block address of a logical block of the plurality of logical units and a physical block address of a physical block of one of the plurality of physical units; and
   a control module for adjusting the mapping relation between the logical block address and the physical block address according to erase cycles of the physical units wherein each of the physical units is associated with a segment table for indicating an allocation status of each physical unit, with an address of the segment table stored in the master table and the segment table defining an allocated flag field for indicating whether the corresponding physical unit is allocated for the user data to be accessed and an alternate segment flag field for indicating whether a physical block address of each physical block for the user data to be accessed is adjusted.

2. The memory system as claimed in claim 1, further comprising a boot file that records information for starting up the memory system, with the information for starting up the memory system including a firmware image, and vendor information.

3. The memory system as claimed in claim 1, wherein the segment table further comprises a physical block address (PBA) offset field for indicating the physical block address of the physical block for the user data to be accessed.

4. A control method for a memory system allowing for accessing a user data between the memory system and a host, wherein the host provides a storage space with a plurality of logical units for accessing the user data the memory system provides a storage space with a plurality of physical units for accessing the user data, each physical unit includes a plurality of physical blocks, and each physical block is composed of a plurality of physical pages, the control method comprising:
   providing a master table in the physical block for recording mapping relation between a logical block address of a logical block of the logical unit and a physical address of a physical block of the physical unit;
   adjusting the mapping relation between the logical block address and the physical block address according to a wear of the physical unit; and
   accessing the user data in one of the plurality of the physical units according to the master table wherein each of the physical units is associated with a segment table for recording information in a head pointer register and a tail pointer register, and for defining an allocated flag field for indicating whether each physical unit is allocated for the user data to be accessed and an alternate segment flag field for indicating whether a physical block address of a physical block of each physical unit for the user data to be accessed is adjusted.

5. The control method for the memory system as claimed in claim 4, wherein a range of the physical blocks allocated and recorded with at least one valid user data is defined by the head pointer register and the tail pointer register for each physical unit, an address value stored in the head pointer register indicates a physical block with the last valid user data, and an address value stored in the tail pointer register indicates a physical block with the oldest valid user data.

6. The control method for the memory system as claimed in claim 4, wherein accessing the user data in one of the plurality of the physical unit according to the master table comprises:
   finding a physical segment indicated by the segment table from the master table;
   finding an available physical block of the segment for the user data to be accessed from the segment table; and
   performing a data process procedure to access the user data in the physical block.

7. The control method for the memory system as claimed in claim 6, wherein performing the data process procedure comprises:
   determining whether the range of the valid physical block surpasses a threshold value or not; and
   executing a block-recycling procedure when the range of the valid physical block surpasses the threshold value.

8. The control method for the memory system as claimed in claim 7, wherein executing the block-recycling procedure comprises:
   determining whether the valid user data stored in the physical block indicated by the tail pointer register is erased or not;

causing the tail pointer register to indicate the next physical block when the valid user data stored in the physical block indicated by the tail pointer register is erased; and executing following steps when the physical block indicated by the tail pointer register is stored with the valid user data:

finding an erased physical block which is the nearest physical block from the physical block indicated by the head pointer register, wherein the nearest physical block is located between the physical block indicated by the head pointer register and the physical block indicated by the tail pointer register;

copying the valid user data in the physical block indicated by the tail pointer register to the erased physical block;

erasing the valid user data stored in the physical block indicated by the tail pointer register; and causing the tail pointer register to indicate the next physical block.

9. The control method for the memory system as claimed in claim 7, further comprising:

updating the segment table and the master table according to the data process procedure.

10. The control method for the memory system as claimed in claim 7, wherein the threshold value is a user setting value, or determined by a number of the free physical blocks reserved by the memory system.

11. The control method for the memory system as claimed in claim 4, further comprising:

updating the mapping relation in the master table.

12. The control method for the memory system as claimed in claim 4, wherein the master table is orderly allocated in the physical pages, and is cyclically allocated in the physical blocks.

* * * * *